(12) United States Patent
Pandey et al.

(10) Patent No.: US 11,397,728 B2
(45) Date of Patent: Jul. 26, 2022

(54) DISTRIBUTED AND BLOCKCHAIN-BASED LEDGERS FOR DATA CLOUD SERVICES

(71) Applicant: Oracle International Corporation, Redwood Shores, CA (US)

(72) Inventors: Saurabh Pandey, San Jose, CA (US); Joseph Rice, New York, NY (US); Siddharth Gupta, Edison, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 236 days.

(21) Appl. No.: 16/835,169

(22) Filed: Mar. 30, 2020

(65) Prior Publication Data

US 2021/0303552 A1 Sep. 30, 2021

(51) Int. Cl.
*G06F 16/20* (2019.01)
*G06F 16/23* (2019.01)
*G06F 21/62* (2013.01)
*G06Q 10/10* (2012.01)
*H04L 9/06* (2006.01)
*G06Q 30/02* (2012.01)
*G06Q 50/26* (2012.01)

(52) U.S. Cl.
CPC ...... *G06F 16/2379* (2019.01); *G06F 21/6218* (2013.01); *G06Q 10/10* (2013.01); *H04L 9/0637* (2013.01); *G06Q 30/0246* (2013.01); *G06Q 50/265* (2013.01); *H04L 2209/38* (2013.01)

(58) Field of Classification Search
None
See application file for complete search history.

(56) References Cited

U.S. PATENT DOCUMENTS

2019/0354989 A1\* 11/2019 Saket ...................... H04L 63/10

OTHER PUBLICATIONS

Choudhury et al., A Blockchain Framework for Managing and Monitoring Data in Multi-Site Clinical Trials, Arxiv.Org., Feb. 11, 2019, 13 pages.

\* cited by examiner

*Primary Examiner* — Belix M Ortiz Ditren
(74) *Attorney, Agent, or Firm* — Invoke

(57) ABSTRACT

Techniques are described herein for managing transactions between data consumers and data providers using a blockchain. In some embodiments, a blockchain network receive smart contracts that govern access rights to data sets provided by blockchain members and smart contracts that execute blockchain transactions based on the usage of data sets. When a data set is provided to a blockchain member through the blockchain network, usage of the data set may be tracked. Responsive to detecting usage of the data set, one or more smart contracts may execute one or more blockchain transactions within the blockchain network.

20 Claims, 6 Drawing Sheets

DISTRIBUTED AND BLOCKCHAIN-BASED LEDGERS FOR DATA CLOUD SERVICES

RELATED APPLICATIONS; INCORPORATION BY REFERENCE

This application is related to application Ser. No. 14/941,047, filed Nov. 13, 2015, titled "ASSOCIATING ANONYMOUS INFORMATION TO PERSONALLY IDENTIFIABLE INFORMATION IN A NON-IDENTIFIABLE MANNER", which is hereby incorporated by reference.

TECHNICAL FIELD

The present disclosure relates to distributed computing systems and architectures. In particular, the present disclosure relates to managing distributed ledgers for members of a permission-based blockchain network to enhance data transactions.

BACKGROUND

Cloud-based data management platforms include networked computing resources for managing data transactions between data providers and data consumers. A data consumer in this context may include a computing application that is connected to or otherwise integrated with the cloud-based data management platform. The consumer application may leverage data from the platform to enhance various data-driven functions. For example, the application may select and/or trigger automated actions that have the highest probability of success as inferred from the data. The cloud-based data management platform may also provide or enhance actionable insights to the consumer application by running big data, machine learning, and/or other artificial intelligence (AI) analytics on targeted data sets.

Data privacy, data integrity, and system scalability may be concerns among participants in a cloud-based data management platform. Data providers and consumers may not inherently trust other participants within the cloud system. Data breaches and unauthorized usage of data sets may expose a data provider and data consumer to various risks, including legal liability, exposure of confidential information to unauthorized entities, data corruption, and revenue loss. Further, inaccurate or low-quality data may limit or harm the performance of consumer applications, leading to ineffective resource utilization. Large-scale systems may link thousands or more entities, increasing the risk of losing track of sensitive data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
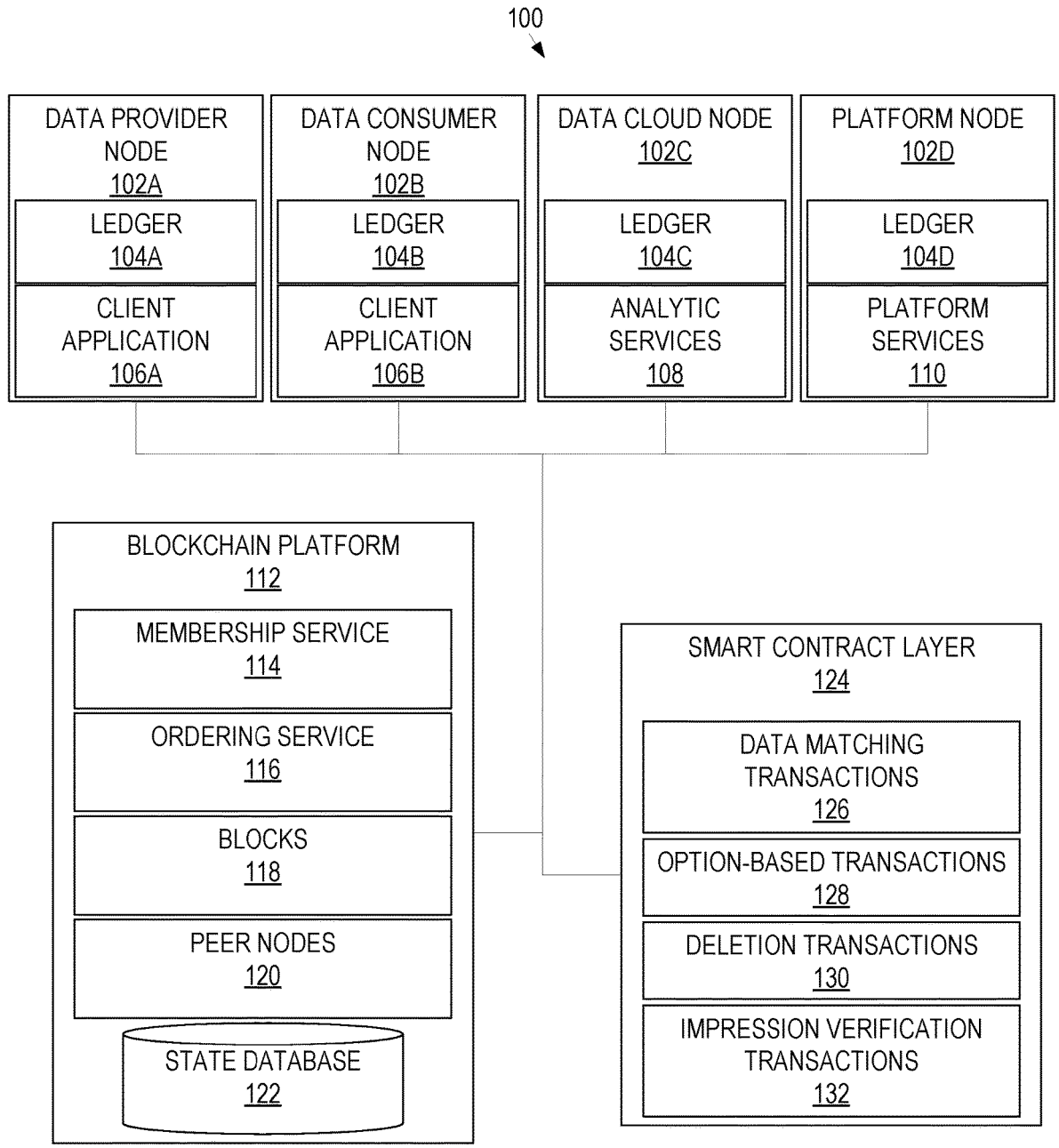
FIG. 1 illustrates an example system for managing data transactions between different participants within a blockchain network in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DISTRIBUTED LEDGERS AND PERMISSIONED BLOCKCHAINS
3. LEDGER TRANSACTION MANAGEMENT
4. SMART CONTRACTS FOR SHARING IDENTIFIERS AND OTHER DATA
5. DATA USAGE AND PERFORMANCE-BASED SMART CONTRACTS
6. LEDGER-BASED DELETION TRACKING AND PRIVACY CONTROLS
7. SMART CONTRACTS FOR AUTOMATICALLY MODIFYING SHARED DATA SETS
8. COMPUTER NETWORKS AND CLOUD NETWORKS
9. HARDWARE OVERVIEW
10. MISCELLANEOUS; EXTENSIONS

1. GENERAL OVERVIEW

Techniques are described herein for managing transactions between data consumers and data providers using a blockchain. A blockchain in this context comprises a collection of technologies that differ from a traditional database. A blockchain comprises a system for maintaining ledgers that are distributed to multiple blockchain members or participants. A distributed ledger stores a consensus of facts and a history of the ledger's updates. The ledger may comprise a continuously growing list of records, batched within blocks, that are linked sequentially and secured using cryptographic signatures.

A blockchain allows entities (internal and external) that do not fully trust each other to agree on the updates submitted to a shared ledger by using peer-to-peer protocols rather than a centralized, third-party system that maintains the system independently. Each member of a blockchain may have a copy of the shared ledger, which includes a record of transactions that have occurred on the platform. The distributed ledger is not owned by one specific entity, and updates to the ledger may be blocked unless they conform with agreed upon peer-to-peer protocols. Further, cryptographic links between blocks of the ledger may render the records of transactions written to the ledger immutable and tamper-proof.

In some embodiments, the techniques described herein are implemented in a permissioned blockchain. A permissioned blockchain is one in which membership is restricted to a set of allowed participants. Permissioned blockchains are generally more efficient than public blockchains since the number of nodes on the platform may be limited and the rules within the blockchain network may be updated more quickly. Permissioned blockchains may further enhance the overall data quality by preventing entities from joining that are likely to provide inaccurate, false, stolen, or otherwise compromised data.

In some embodiments, a permissioned blockchain includes data provider member(s), data consumer member(s), application platform member(s), and/or data analytic member(s). Details of each data transaction between blockchain members may be recorded on the shared ledger. The immutable and tamper-proof record may be used to identify and track which data sets were accessed, which source(s) provided the data, which consumer(s) accessed the data, which application platforms used the data, and in what campaigns/context the data was used. The above details may be stored without including data payloads from the data sets that were exchanged to prevent sensitive data from being stored in the shared ledger.

In some embodiments, transactions between members on the blockchain are governed and/or executed by smart contracts, also referred to as chaincode. A smart contract is a program that runs within the blockchain and may be invoked to read and write application data from/to a shared ledger, apply validation logic to allow/deny a transaction, and/or trigger application events. For example, a data consumer may submit a proposed transaction to access data matching a specified set of criteria. In response, a set of nodes within the blockchain network may invoke one or more smart contracts to identify data sets matching the specified criteria, validate whether the consumer has satisfied requirements (predefined or determined at runtime) for accessing the data sets, and, if approved, commit the transaction record to the ledger. Smart contracts may be associated with a peer-to-peer endorsement and verification policies. If the requisite peers do not endorse or verify a transaction proposal, then the transaction may be aborted. An aborted transaction is not committed to the shared ledger.

A blockchain may include various smart contracts that define transaction logic for different types of transactions. In some embodiments, the blockchain includes smart contracts for cooperative matching and sharing of data. Cooperative data sharing may help verify and enhance data. For example, an entity that is a member of the blockchain may have user identifiers for visitors to a website run by the entity. Multiple such entities may contribute their curated user identifiers to match with a generalized identifier provided by the cloud service or other blockchain participants. The matched identifiers may be shared on each member's copy of the ledger, and the usage of the identifiers may be tracked on the blockchain. The pool usage may be governed by smart contracts between the blockchain members. For example, a smart contract may determine the duration for which a matched identifier may be used, where (e.g., what application/platforms) the identifier may be used, and how the identifiers may be used. A smart contract may be invoked to match the user identifiers with one or more other members of the blockchain. A smart contract may also allow for matched data sets to be integrated into an application without exposing sensitive data (e.g., the provided $1^{st}$ party identifiers) to other members of the blockchain.

In some embodiments, the blockchain includes smart contracts that integrate data usage and/or performance metrics into blockchain transactions. For example, smart contracts may execute one or more blockchain transactions if and only if a set of peer-to-peer data usage and/or performance criteria are met/satisfied. The data usage and/or performance criteria may be used to define future option contracts on data sets. For instance, a future options contract on an audience data set may be executed if and only if one or more performance metric thresholds (e.g., impression verification measurements, content views, click-through rates, etc.) are satisfied. Performance metrics for audience data sets may be monitored by a service/platform, which may also be a member of the blockchain.

As another example, smart contracts may be invoked to reconcile transactions within the blockchain based on performance metrics, such as impression verification measurements. Transactions on the blockchain may be initiated to compensate data and/or platform providers as a function of the performance metrics. If the performance metrics do not satisfy a threshold, then the transaction may be reversed or otherwise modified, such as by initiating a refund transaction to account for the low quality of data. When a transaction is reversed, the record of the initial transaction may still be maintained in a block of the ledger, which is immutable. A refund transaction may be written to the same or a different block.

In some embodiments, smart contracts may be invoked and/or be associated with endorsement policies to prevent usage of certain sensitive information. For example, one or more peer nodes within the network may only endorse transactions if the transactions do not include the sensitive information, such as user identifiers, for users that have opted out from having information shared with other entities. A shared ledger may track data deletion requests as part of an immutable record. During endorsement, a peer node may compare the proposed transaction against the data deletion requests and prevent the transaction if it includes information about users that have opted-out of information sharing.

In some embodiments, smart contracts may be invoked to modify data sets shared on the blockchain network. For instance, a smart contract may incorporate criteria for grouping, separating, editing, and/or otherwise modifying a data set based on criteria specified by one or more blockchain members and/or privacy constraints. When a proposed blockchain transaction is submitted to access a data set, the smart contract may be executed to automatically modify the data set in accordance with the criteria and/or privacy constraints before the data set is delivered to the consuming blockchain member.

One or more embodiments described in this Specification and/or recited in the claims may not be included in this General Overview section.

2. DISTRIBUTED LEDGERS AND PERMISSIONED BLOCKCHAINS

In some embodiments, the techniques described herein are implemented as a blockchain service. A blockchain service refers to a network service, such as a platform-as-a-service (PaaS) or other cloud service, for maintaining blockchain-based distributed ledgers. As previously noted a distributed ledger may include a set of blocks, linked through cryptographic values, that maintain a consensus of facts and the history of the ledger's updates. Distributed ledgers may be replicated, shared, and/or synchronized across multiple peer nodes within a blockchain network.

As previously noted, the blockchain service may be a permissioned blockchain, whereby access to a blockchain network is restricted to permitted data providers, data consumers, application platforms, analytic service providers, and/or other entities. Permission may be granted by one or more founding members of a blockchain network or in accordance with a governance model. For example, if an institution wishes to join the permissioned blockchain, other institutional members may vote, or a board may decide whether to grant permission. As another example, permission for institutions may be restricted to those that have been accredited by a recognized accreditation agency. Other governance models may also be used, depending on the particular implementation.

In some embodiments, the blockchain service generates and maintains accounts for members that have been granted permission to join the blockchain network. Member accounts may include credentials to access a cryptography-based, tamper resistant ledger. Members may initiate transaction proposals, which invoke smart contracts, to read from and/or write to shared ledgers subject to restrictions as described further herein.

FIG. 1 illustrates an example system for managing data transactions between different participants within a blockchain network in accordance with some embodiments. As illustrated in FIG. 1, system 100 includes data provider node 102a, data consumer node 102b, data cloud node 102c, platform node 102d, blockchain platform 112, and smart contract layer 124. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. In some cases, multiple components may be combined into one application and/or machine. Operations described with respect to one component may instead be performed by another component.

Data provider node 102a is an operating network entity corresponding to a member of a blockchain that supplies data. Data provider node 102 stores a copy of a shared ledger (ledger copy 104a) and has a client application 106a for interfacing with the blockchain service. In some embodiments, client application 106a invokes a set of application programming interfaces (APIs) and or software development kits (SDKs) to interact with chaincode and consume events. For example, client application 106a may invoke chaincode to specify what data sets are available to share, conditions for accessing the data set, and restrictions on when/where the data may be used.

Data consumer node 102b also stores a copy of the ledger (ledger copy 104b) and includes client application 106b for interfacing with the blockchain service. In some embodiments, the chaincode that may be invoked through client application 106b is tailored to the role of a data consumer and different than the chaincode that is accessible through client application 106a. For example, data consumers and providers may be restricted to initiating different types of transactions within the blockchain. Restrictions may be enforced based on membership credentials, such as a public-private key pairing. In other embodiments, a member node may be permitted act as both a data provider and data consumer within the blockchain. In this case, the member node may be permitted to use the same credentials to initiate transaction proposals for both supplying and consuming data.

Data cloud node 102c stores a copy of the shared ledger (ledger copy 104c). Data cloud node 102c further provides analytic services 108, which may run analytics on already consumed and/or to-be-consumed data sets. In some embodiments, analytic services 108 may invoke smart contracts to read and/or write performance metrics to the distributed ledger.

Additionally or alternatively, analytic services 108 may invoke one or more smart contracts based on data usage and/or performance metrics. Examples include, but are not limited to, options contracts and reconciliation contracts, which are described in further detail in Section 5, titled "Data Usage and Performance-Based Contracts."

Additionally or alternatively, data cloud node 102c may invoke smart contracts to enforce privacy constraints and/or automatically modify data sets. criteria provided by other blockchain members. Example smart contracts for enforcing privacy constraints and performing data modifications are described in Section 6, titled "Ledger-Based Deletion Tracking" and Section 7, titled "Smart Contracts for Automatically Modifying Shared Data Sets."

Platform node 102d stores a copy of the shared ledger (ledger copy 104d) and further provides platform services 110. In some embodiments, platform services 110 include campaign delivery platform services. For example, platform services may include logic for inserting campaign messages within one or more pages of a website. Platform services may format the campaign messages (e.g., via HTML, cascading style sheets, etc.) to conform to the look and feel of a webpage. As another example, platform services may provide an application, such as a forecasting tool, baselining tool, anomaly detection tool, or other data analytics tool that consumes data to provide an automated analytic output. The analytic output may trigger one or more automated actions and/or be consumed by other applications within the blockchain which may also apply further analytics and/or trigger application-specific actions.

In some embodiments, a blockchain member may belong to one or more blockchain channels. A channel in this context refers to a subnet within a blockchain network with an isolated ledger and an authorized group of blockchain members/nodes. Transactions executed on a specific channel may be restricted to accessing the ledger on that channel, however a member that belongs to different channels may execute independent transaction on each channel. Thus, although only one ledger is depicted per node, a blockchain node may store copies of multiple ledgers (e.g., one per channel to which the node belongs). Further, the number and types of blockchain nodes may vary depending on the particular implementation.

Blockchain platform 112 comprises a set of nodes and services for managing distributed ledgers. Blockchain platform may generally comprise membership service 114, ordering service 116, blocks 118, peer nodes 120, and state database 122. Blockchain platform 112 may provide a closed ecosystem where only invited entities can join the permissioned blockchain network (and/or subnets/channels thereof) and keep a copy of a distributed ledger.

Membership service 114 is configured to manage roles and access policies for members of the blockchain network according to some embodiments. For example, membership service 114 may handle adding, verifying, and canceling membership within the blockchain network. As another example, membership service 114 may define access policies for different user roles. For instance, membership service 114 may assign members to different blockchain channels, where each blockchain channel maintains an isolated distributed ledger for a corresponding subset of members of the overall blockchain. A member may be granted cryptographic keys to access the corresponding ledger and/or smart contracts that have been deployed to the blockchain channel.

In some embodiments, membership services 114 may define and enforce different access policies for founding members and participant members. For example, founding members may determine which participant members are able to join the blockchain network. When a new member is added, a digital certificate may be generated to confirm the identity of the member within the blockchain network. Founding members may be comprised of a subset of members on the blockchain network or may be third-party members that do not participate in transactions on the blockchain network.

Ordering service 116 is a set of one or more nodes for creating new blocks from transactions sent by members of the blockchain network. Ordering service 116 may include a single ordering process or a cluster of processes. Ordering service 116 may validate proposed transactions and sequence the transaction into blocks.

Blocks 118 are data objects used to store a consensus of facts for a shared ledger. Blocks may be added to the chain when updates occur, such as when a member writes new data (e.g., a record of a transaction between a data consumer and data provider) to the ledger. Each block within a blockchain includes a cryptographic hash of the previous block that links the blocks together. A block may further comprise a timestamp indicating when the block was generated, the current state of the ledger, and/or transaction data identifying the transactions (e.g., write operations) that resulted in the current state of the ledger. The cryptographic link between blocks in a blockchain enhance the tamper-proof nature of a shared ledger. Altering the data within one block may require re-computation of the cryptographic hash value for each of the subsequent blocks in the chain. A consensus protocol among the peer nodes may prevent such tampering.

Peer nodes 120 are operating entities on the blockchain network that are responsible for maintaining a copy of the ledger, running smart contracts, and committing transactions. Peer nodes 120 may include one or more of data provider node 102*a*, data consumer node 102*b*, data cloud node 102*c*, and platform node 102*d*. A blockchain member may have one or more peer nodes on the blockchain network.

In some embodiments, a peer node is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

State database 122 tracks the current state of one or more distributed ledgers. State database 122 may be used to detect peers that are offline and update blocks to peers that are out of sync. In some embodiments, the state includes state information about data being exchanged through the blockchain. For example, the state may include, but is not limited to, one or more of the following attributes:

Data bought: Indicates whether the data has been purchased by another member of the blockchain network;

Data used: Indicates whether the data has been used by another member of the blockchain network, such as in an online campaign by campaign management software;

Campaign messages seen: Indicates whether an online campaign message that used the data was viewed, clicked on, or otherwise seen via a client application, such as a web browser;

Identity used in x context: Identifies the context in which the data was used;

Consent state over a period of time: Tracks the consent of a user, which may change over a period of time or vary based on the kind of supplier and marketer using the data; and Audit state: Tracks the state of an audit of transactions associated with the data.

It is noted that the above attributes may be tracked within the state database and/or distributed ledgers without storing the data payloads that are exchanged between different blockchain members. Thus, an immutable and tamper-proof record of how and when data is used may be created without compromising the privacy of the data.

Smart contract layer 124 includes blockchain programs that may be invoked by blockchain nodes to read and write application data from/to a ledger, apply validation logic and/or trigger application events. A chaincode may be installed/instantiated on one or more blockchain channels. However, the same chaincode may be run in different contexts that are specific to a channel. For example, the required endorsements to executed a smart contract may vary from one blockchain channel to another.

In some embodiments, the blockchain programs define transactional logic for various types of transactions including, but not limited to:

Data matching transactions 126 comprising chaincode for matching available data sets with criteria;

Option-based transactions 128 comprising chaincode for handling options placed on data sets;

Deletion transactions 130 comprising chaincode for handling request to delete sensitive information or opt-out of information sharing;

Impression verification transactions 132 comprising chaincode for reconciling transactions based on measured impression metrics for data sets;

State change chaincode for updating and/or otherwise modifying data within state database 122;

Payment chaincode for processing payments for data access within the blockchain;

Reconciliation chaincode for reconciling transactions within the blockchain; and Revenue chain code for tracking revenue from data usage and initiating revenue-based transactions within the blockchain.

Example smart contract functions are described in further detail in the sections below.

Additional embodiments and/or examples relating to computer networks are described below in Section 6, titled "Computer Networks and Cloud Networks."

3. LEDGER TRANSACTION MANAGEMENT

As previously mentioned, peer nodes may be configured to manage transactions within a blockchain, including reads and writes to shared ledgers. For example, peer nodes may endorse, validate, order and/or commit transaction records that satisfy prescribed policies. Transaction records may be used restrict and track exchanges of data between blockchain members.

Figure 2:
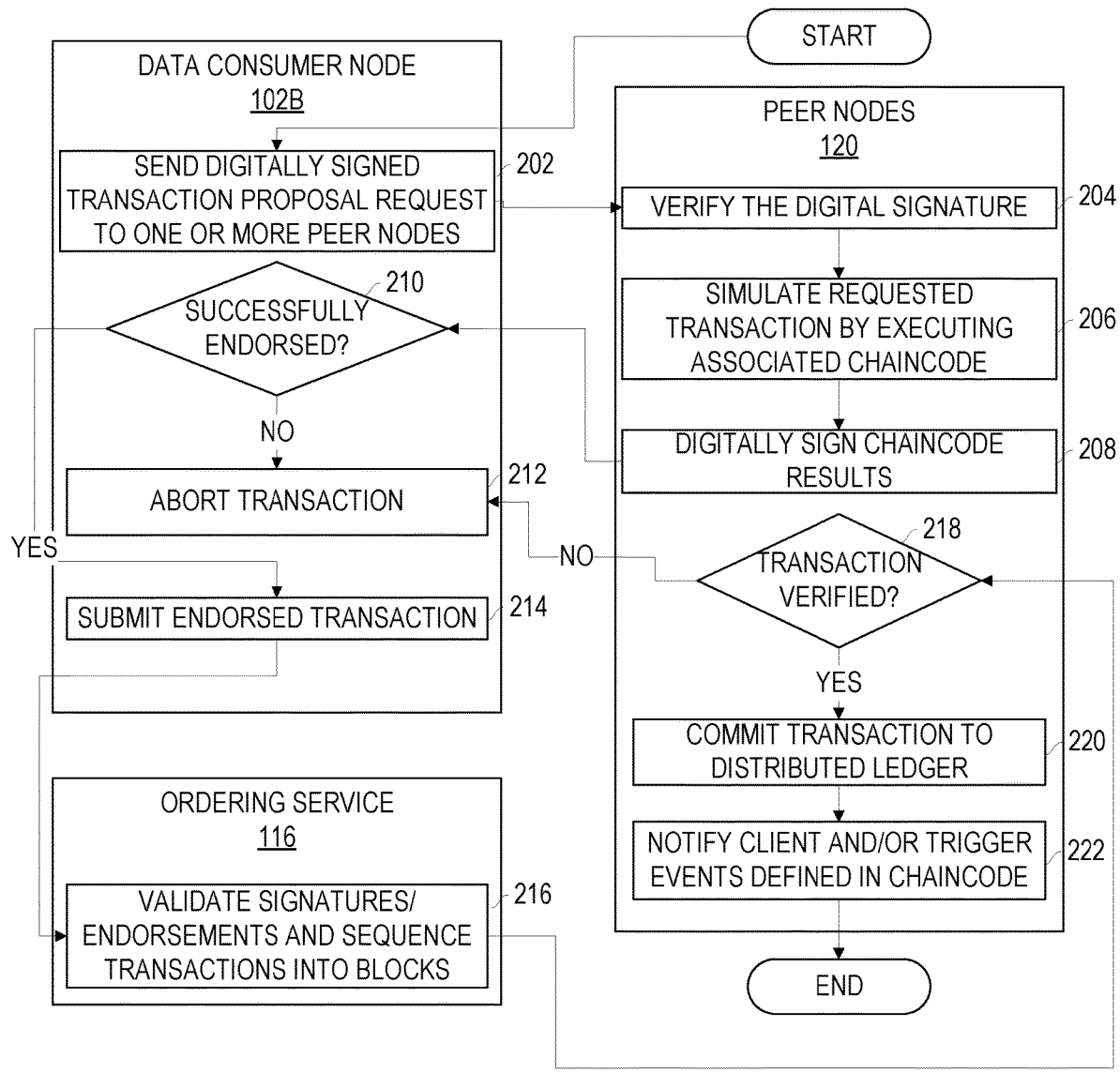
FIG. 2 illustrates an example set of operations for managing a transaction flow within a blockchain network in accordance with some embodiments.

FIG. 2 illustrates an example set of operations for managing a transaction flow within a blockchain network in accordance with some embodiments. One or more of the steps may be omitted, repeated, and/or performed in a different order. Accordingly, the specific arrangement of steps shown in FIG. 2 should not be construed as limiting the scope of the embodiments.

The transaction flow includes sending, by data consumer node 102b a digitally signed transaction proposal request to one or more peer nodes (operation 202). Although a data consumer node initiates the request in the present example, other blockchain members may initiate transaction, depending on the particular implementation. Further, the types of transactions that may be initiated on the blockchain may vary depending on the member role (e.g., consumer-initiated transactions, provider-initiated transactions, platform-initiated transactions, etc.).

One or more of peer nodes 120 receives the transaction proposal and verifies the digital signature (operation 204). In some embodiments, a digital signature is verified using a public-private key pairing. For instance, data consumer node 102b may provide peer nodes 120 that are part of the same blockchain channel with public keys. Data consumer node 102 may use the private key to digitally sign the request, which may be verified by the peer nodes 120 using the provided public key.

Once verified, the one or more peer nodes simulate the requested transaction by executing the requested chaincode (operation 206). In some embodiments, simulating the transaction includes generating a chaincode results (e.g., a read-write set for a distributed ledger). The result is not committed to the ledger at this time.

The one or more peer nodes next digitally sign the chaincode results and return the results to data consumer node 102b (operation 208). Each peer node may use a private key to digitally sign the chaincode results.

Data consumer node 102b receives the results from the one or more endorsing peer nodes and determines whether the proposed transaction was successfully endorsed (operation 210). In some embodiments, this operation includes verifying the signatures of each endorsing peer, checking to see if the results from different peers match, and verifying the endorsement policy requirements established for the chaincode (or chaincode channel) have been satisfied.

If the transaction was not successfully endorsed (e.g., the endorsement policy requirements were not met), then the transaction is aborted (operation 212).

Otherwise, data consumer node 102b submits the endorsed transaction to ordering service 116 to proceed with committing the proposed transaction (operation 214). In some embodiments, the submitted transaction includes the results (e.g., the read-write sets) and signatures from each endorsing peer.

Ordering service 116 validates the signatures/endorsements submitted by data consumer node 102b and sequences the submitted transactions into blocks (operation 216). The manner in which blocks are ordered may vary from implementation to implementation (e.g., ordering may be based on timestamps, *byzantine* fault tolerance, etc.).

The ordering service next submits the new blocks to one or more of peer nodes 120 to commit the transaction (operation 218). The committing peers may be the same or a different set of peer nodes than the endorsing peers.

The committing peers determine whether the transaction is verified (operation 220). In some embodiments, each committing peer validates the signatures, determines whether the endorsement policy is satisfied, and compares the values of keys/variables read at endorsement time with the current values for changes.

If the transaction cannot be verified (e.g., invalid signature, endorsement, or change in key values), then the transaction is aborted (operation 212).

Otherwise, the transaction is committed to the distributed ledger (operation 222). The updated ledger may be replicated across all members of the blockchain channel. It is noted that invalid/aborted transactions may still be written to a ledger; however a commit flag for the transaction may be used to indicate that the transaction committed or failed.

4. SMART CONTRACTS FOR SHARING IDENTIFIERS AND OTHER DATA

In some embodiments, smart contracts may define transaction logic for handling exchanges of data between members of the blockchain. For example, a smart contract may define the conditions/criteria under which a data set is exchanged. The conditions, may include, but are not limited to:

- Required consideration to access the data set (e.g., a purchase price/remittance, an acceptable trade of information, consent and data usage rights, etc.);
- Restrictions on how long the data set may be accessed (e.g., the data set may be accessed for a specified window of time or until a particular date); and
- Restrictions on how the data set may be used (e.g., the data set may only be used on certain applications/platforms nodes in the blockchain).

In some embodiments, smart contracts include chaincode for managing transactions as part of an automated campaign management system. Data providers may include applications configured to collect user information. For example, an application may extract HTTP cookies of visited websites, crawl webpages to scrape targeted information, track information generated through the usage of online services, etc. Data providers may allow consumers of the blockchain network to access the collected data subject to the conditions defined in the smart contract. The consumers may initiate transactions to search for and access data meeting a specified set of criteria (e.g., within a threshold price range, from a specified subset of providers, targeting users matching a specified profile). Data consumers may further initiate transactions with platform members to use the provided data as part of an online campaign. For instance, the provided data may be used to identify information about visitors that are accessing a webpage to customize the web page in a manner that is determined to most likely be relevant to the user. The content, visual elements, and manner in which the webpage is rendered may thus vary from one user to the next.

Additionally or alternatively, consumed data may be used in other applications. For example, a machine-learning (ML) service may rely on quality training data to train and accurate model. The entity wishing to train the machine-learning service may not have access to quality data. The raw data may be acquired through the blockchain network and then transformed by a ML application for use in training and evaluating ML models.

Additionally or alternatively, smart contracts may govern cooperative data sharing arrangements. For example, different data providers may have incomplete sets of information on a set of users. The data providers may submit first party identifiers to a data cloud service to be matched against third-party/centralized identifiers. If two or more data providers have matched the same third-party identifier, then the third-party identifier may be shared/written to the distributed ledger. The data cloud service may execute the matching process with restricted visibility such that information on the matched users may be shared without compromising/revealing the first party identifiers. For example, the data cloud service may be configured such that only matched third-party identifiers are permitted to be accessed by human users or external network nodes. Thus, individuals and external applications may be prevented from accessing first party identifiers that have been submitted by other members of the blockchain.

Figure 3:
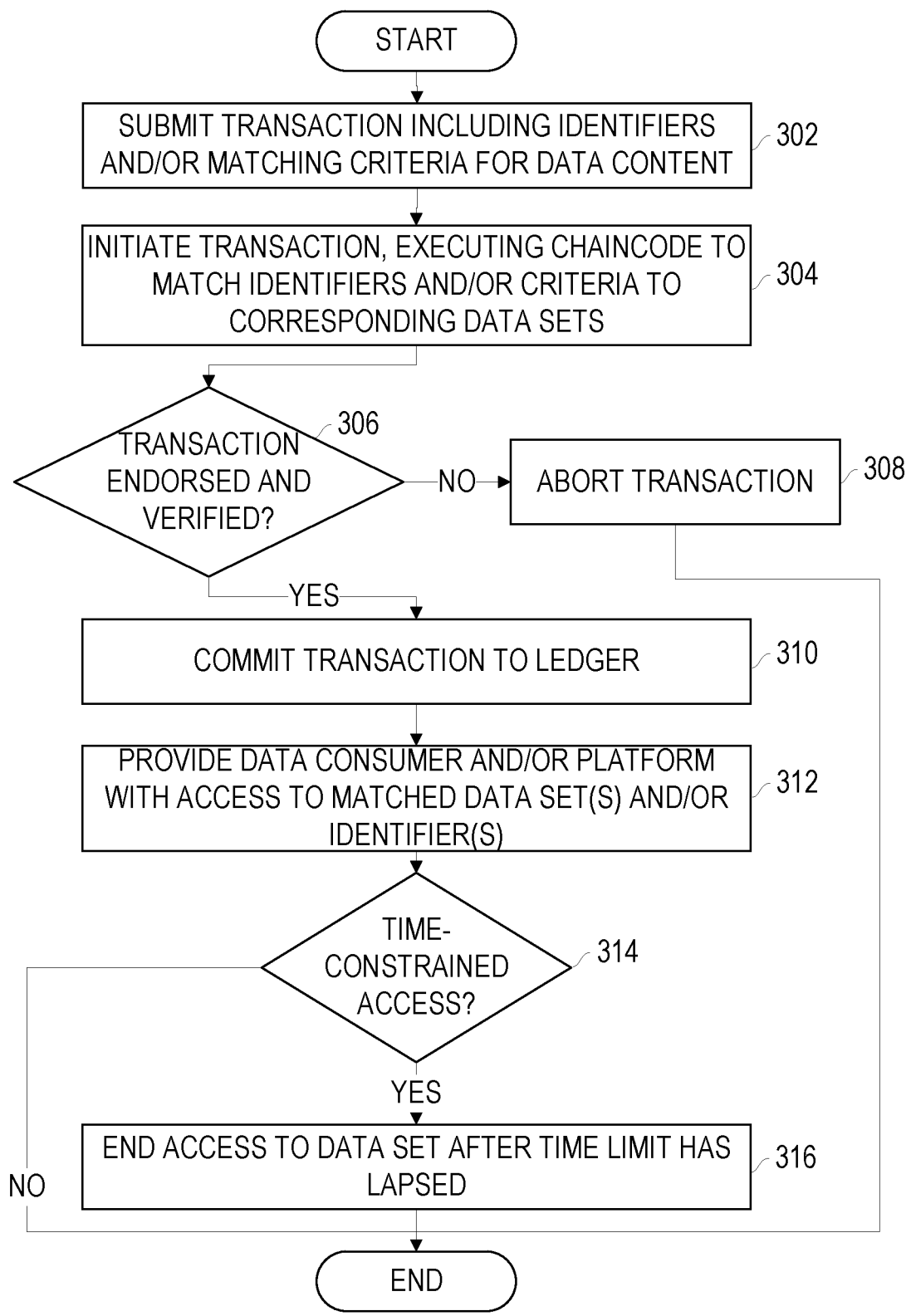
FIG. 3 illustrates an example set of operations for initiating and managing transactions between data consumers and data providers through a blockchain network in accordance with some embodiments.

FIG. 3 illustrates an example set of operations for initiating and managing transactions between data consumers and data providers through a blockchain network in accordance with some embodiments. One or more of the steps may be omitted, repeated, and/or performed in a different order. Accordingly, the specific arrangement of steps shown in FIG. 3 should not be construed as limiting the scope of the embodiments.

Referring to FIG. 3, a blockchain member submits a transaction including identifiers and/or matching criteria for data content (operation 302). For example, a data consumer may request identifiers and/or other user information for users matching a certain profile. As another example, a blockchain member may submit a request for training data having a specified set of attributes or submit an incomplete data set to share with other members that may provide additional information on the data set. In yet another example, a blockchain member may provide first party identifiers for cooperative data sharing as previously described.

Responsive to receiving the transaction proposal, one or more peer nodes initiate the transaction, executing the chaincode to match identifiers and/or criteria to corresponding data sets (operation 304).

The peer nodes next determine whether the transaction proposal is endorsed and verified (operation 306). For example, the transaction flow depicted in FIG. 2 may be implemented based on the invoked smart contract and associated endorsement policies to determine whether the transaction should be committed.

In the event that the transaction fails or cannot be verified, then the transaction is aborted (operation 308). As previously noted, a failed transaction is not committed to the blockchain, but may still have its details written with a flag indicating that it failed.

If the transaction is successfully endorsed and verified, then the peer nodes commit the transaction to the shared ledger, which is distributed/replicated to the members of the blockchain channel (operation 310). The shared ledger may include various details about the data that was exchanged. For example, TABLE 1 below depicts an example set of transaction records that may be written to a block of the blockchain.

TABLE 1

EXAMPLE TRANSACTION RECORDS

| Impressions | Cost | CategoryIDS | Provider ID(s) | Attribution Info | Consumer ID | Exp Date |
|---|---|---|---|---|---|---|
| 3 | 0.95 | 4250\|1234\|7540 | XYZ, Inc.\|ABC, Inc. | 0.4\|0.6 | ZPC, Inc. | Feb. 24, 2020 |
| 22 | 1.04 | 2330\|9412 | XYZ, Inc. | 1 | TRB, Inc. | Apr. 10, 2020 |

The above record include performance metrics for the data sets (impressions, cost, category identifiers for the provided data sets, identifiers of the data provider(s) that supplied the data set, attribution information indicating what portion of the data each provider supplied, a consumer identifier for the entity accessing the data and an expiration date for accessing the data). The above records are given by way of example. The transaction attributes that are stored may vary depending on the particular implementation. Other attributes may include, but are not limited to any of the attributes listed above with respect to the state database, such as the application context for which the data was used and the audit state of the data. Further, the attributes/attribute values for records that belong to a same block may be hashed, as previously indicated. The hash may be stored in the subsequent block to provide a cryptographic link between the different blocks written to the ledger.

The smart contract may further trigger exchange of data between the data provider(s) and consumer and/or platform nodes (operation 312). For example, the data may be provided to a campaign delivery platform. The campaign delivery platform may then monitor, through embedded script tags, webpage accesses for visitors that match a user identifier. The campaign delivery platform may then customize/render the webpage in a manner that is tailored for the identified user.

The smart contract may further allow for time-constrained data access (operation 314). If access is time-constrained, then one or more blockchain nodes may continue to monitor the transaction until the time limit has lapsed.

Once the time limit has lapsed, the ledger may be updated (e.g., a new transaction may be initiated) to end the access to the data set (operation 316). In some embodiments, the data sets (e.g., user ids, etc.) may be provided directly to the platform members rather than the data buyers. This may allow platforms to execute functions on the data sets without revealing the data sets to the data buyer. In other cases, the data buyer may still have access to the data at the time it existed before access has been cutoff. A data set may continuously/periodically evolve, which reduces the quality of an older data set over time.

5. DATA USAGE AND PERFORMANCE-BASED SMART CONTRACTS

In some embodiments, smart contracts execute blockchain transactions as a function of data usage and/or performance metrics. As previously noted, analytic services 108 may capture performance metrics associated with the usage of data sets available through the blockchain. Analytic services 108 may periodically initiate transactions to write the performance metrics to a distributed ledger.

In some embodiments, analytic services 108 collects performance metrics from web sites or applications where the data sets are used. For example, script tags may be included in code for loading/rendering a campaign message. The script tag may include macros that resolve to reporting various performance metrics. Example performance metrics may include, but are not limited to, impression counting (e.g., a count of the number of times a data set is used to load and render a campaign message on a webpage), a measurement of how much of the rendered campaign message was in-view/visible through the browser/client application (e.g., a percentage value between 0-100, click-through rates for hyperlinks included in the campaign message, likes/positive interactions with the campaign message, an overall effectiveness score of the campaign message, a cost measure, measurements of the data accuracy, etc.

When a peer node is running a smart contract, the peer node may read performance metrics for a data set from the distributed ledger. The performance metrics may affect the runtime behavior of the smart contract. For example, the smart contract may execute a transaction on a data set only if the performance metrics are above a threshold or may match the highest performing data set in a particular category. As another example, a data set may be dynamically priced based on its performance metrics—the consideration required to access the data set may be continuously or periodically adjusted. The price for a data set may increase as a function of higher performance metrics or decrease as performance metrics decline.

Additionally or alternatively, smart contracts may account for the context in which a data set is used. The criteria to access a data set may vary from one context to another. For example, a smart contract may deny access to a data set to an online campaign that directly competes with the data provider or require a higher price for using the data set in that context than for other context that are not directly competitive. As another example, a smart contract may provide discounts for educational or non-commercial campaigns (or other applications) that use the data set.

In addition or as an alternative to options-based contracts, performance metrics may be integrated with smart contracts for transaction reconciliation. For example, the smart contract may automatically initiate a transaction within the blockchain to issue payments for usage of a data set based on the performance metrics—a higher payout may be sent the greater the number of impression counts and/or the greater the impression quality obtained through using a provided set of user identifiers. As another example, a transaction may be initiated to issue a full or partial refund, from the platform nodes and/or providers to the consumer, if the performance metrics for a metric fall below a threshold. Thus, the data providers are incentivized to provide clean and accurate data to the blockchain, and the platform providers are incentivized to use the data in a manner that is most effective for the consumer.

Figure 4:
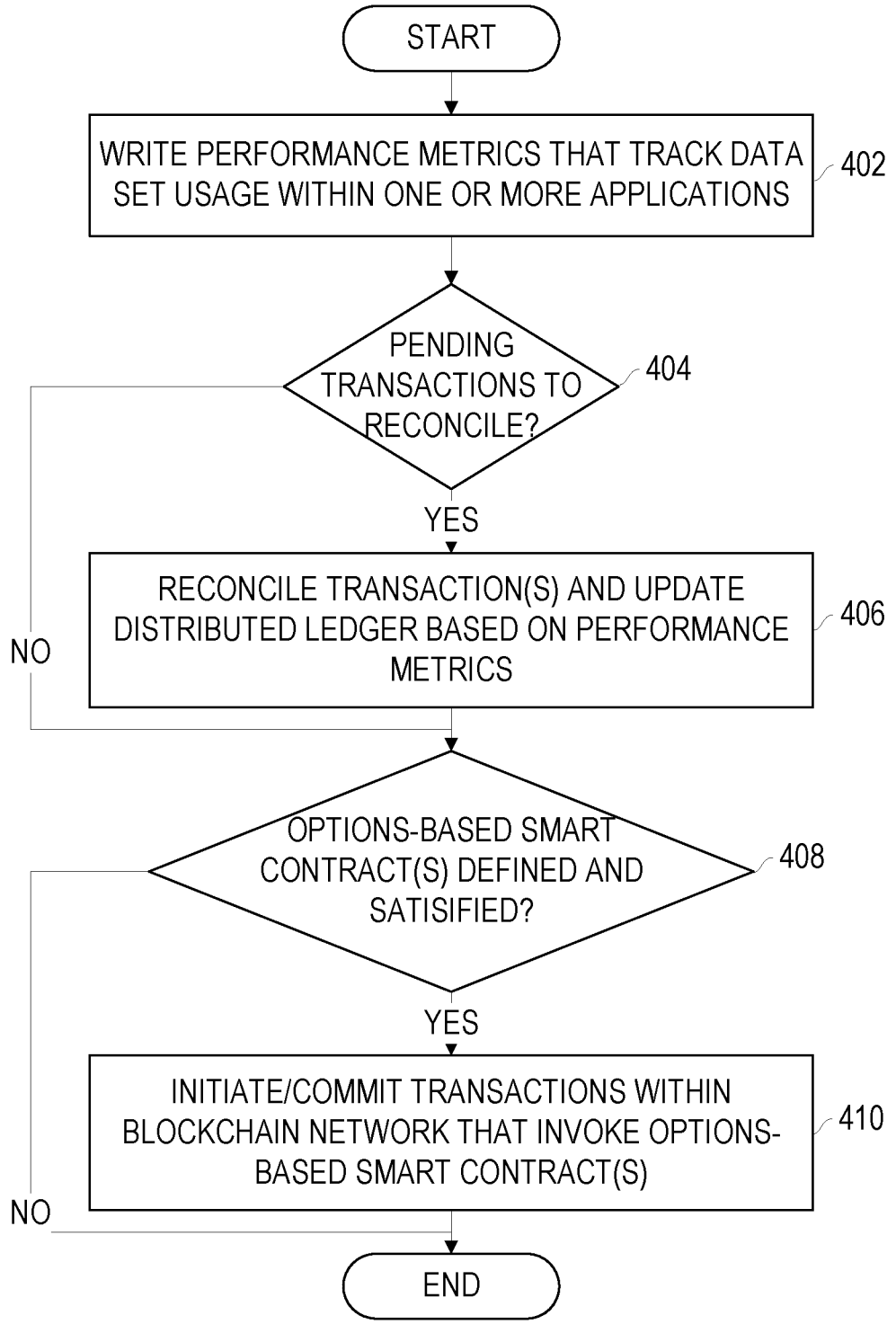
FIG. 4 illustrates an example set of operations for executing transactions on the blockchain network through performance-based smart contracts in accordance with some embodiments.

FIG. 4 illustrates an example set of operations for executing analytic-based transactions on the blockchain network in accordance with some embodiments. One or more of the steps may be omitted, repeated, and/or performed in a different order. Accordingly, the specific arrangement of steps shown in FIG. 4 should not be construed as limiting the scope of the embodiments.

Referring to FIG. 4, a set of performance metrics that track usage of a data set within one or more applications are written to a ledger (operation 402). For example, data cloud node 102c may periodically write the performance metric to a blockchain channel dedicated to tracking performance data on available data sets. As previously noted, the performance metrics may include metrics on audience data sets that have viewed or interacted with an online campaign, such as through a web browser or mobile application.

In some embodiments, peer nodes use the performance metric to determine whether to reconcile any pending transactions (operation 404). For example, if the performance metrics do not satisfy a threshold (e.g., one or more impression metrics for an audience data set provided through script tags do not meet requirements of a smart contract), then the transaction flagged for reconciliation. This step may be done during runtime of a smart contract and/or responsive to detecting a new write of performance metrics. During runtime of one smart contract, a peer node may invoke another smart contract to query the performance metrics that are written to a ledger on another blockchain channel.

If there are transactions to reconcile based on the performance metrics, then the reconciliation process is initiated on the blockchain and the distributed ledger is updated accordingly (operation 406). In some embodiments, the record of the transaction may be updated to include the performance metrics that triggered the reconciliation. For example, a money transfer transaction on the blockchain may be triggered between a data buyer and a data provider for each 100 positive impressions obtained through use of the data set. In other embodiments, a refund may be issued to the data buyer by the platform and/or data provider if the performance metrics do not satisfy a threshold (e.g., there is little to no positive impact on an online campaign).

In some embodiments, transaction reconciliation may be performed based on attribution metrics. For example, combined data sets acquired from multiple providers may be accessed by a data consumer and used in an online campaign. The data providers may be compensated based on which data they provided, the performance of their data versus data from other providers, and/or other metrics.

Additionally or alternatively, the process may include determining whether any options-based smart contracts have been defined and satisfied (operation 408). For example, as previously described, a future options contract may be defined with reference to a target audience data set. The future options contract may define one or more performance thresholds, such a minimum number of positive impressions, a minimum click-through rate, a minimum level of audience engagement with an online campaign, a maximum cost per impression, etc.

If the option criteria are satisfied, then the transaction may be executed/committed to the blockchain. (operation 410).

6. LEDGER-BASED DELETION TRACKING AND PRIVACY CONTROLS

In some embodiments, a blockchain channel comprises a ledger for tracking data deletion requests. A deletion request may include user requests to opt-out of having their information used or shared by members of the blockchain. The ledger may serve as an immutable audit trail to track information about which users submitted the requests and when the requests were submitted.

In some embodiments, an identity resolution chain is responsible for formatting and writing deletion requests to the blockchain. Data provider nodes may forward opt-out requests to the identity resolution service The identify resolution chain may match $1^{st}$ party identifiers of the data providers to centralized $3^{rd}$ party identifiers (e.g., BlueKai identifiers) and write these identifiers to the blockchain.

During endorsement, a peer node may compare the proposed transaction against the data deletion requests and prevent the transaction if it includes information about users that have opted-out of information sharing. For example, the peer node may be an endorser, and the endorsement of a proposed transaction may be denied if it involves the use of the sensitive data for a user that has opted-out of information sharing.

Additionally or alternatively, a blockchain channel may implement other privacy controls. In some embodiments, the blockchain network may enforce constraints on how a data set may be viewed/used by a data buyer. For example, the blockchain network may block access to certain parts of an audience data set that includes sensitive information, such as personal identifying information, personal health information or credit card numbers.

As another example, the blockchain network may restrict access to information in a manner that prevents visibility into the audience data set. For instance, upon purchase of an audience data set, the data buyer may not be able to access the data set in a manner that allows visibility into the data. The audience data set may be provided to a platform node such that it is used to execute an online campaign. The data buyer may view data usage and performance metrics associated with the audience data set. However, the data buyer may be prevented from viewing the specifics about individual audience members within the audience data set.

7. SMART CONTRACTS FOR AUTOMATICALLY MODIFYING SHARED DATA SETS

In some embodiments, smart contracts may trigger automatic modifications to data sets as a function of member-specified criteria and/or privacy constraints. The modifications triggered by a smart contract may control how data sets available through the blockchain network are accessed, protect sensitive information from unauthorized access, and/or ensure compliance with privacy laws.

In some embodiments, blockchain members may define rules or logic the controls how their shared data sets may be modified, if at all, and the conditions under which the modification are triggered. For example, a data provider may have an audience data set comprising thousands of records, where each record includes contact information (e.g., HTTP cookie identifiers, email addresses, etc.) for a respective potential audience member of an online messaging campaign. The data provider may specify rules including (a) whether the data set is allowed to be broken into discrete subsets and/or joined to data sets; (b) the conditions under which the data set may be broken into subsets and/or joined to other data sets. In some cases, the data provider may allow a consumer to purchase a subset of the records at a reduced price or limit access to a subset of audience member attributes. In other cases, the data provider may allow or prevent the data sets to be linked with data sets from other data provider members. As may be appreciated, the rules and conditions may vary and be customizable by blockchain members. Based on the submitted rules/conditions, the blockchain platform may generate smart contract chaincode to control data set modifications.

Additionally or alternatively, smart contracts may comprise chaincode that triggers application of one or more privacy filters to protect sensitive data. Once triggered, a privacy filter may execute data masking and/or redaction operations on a data set to obfuscate or remove private information. For example, individual names within a set of records may be removed or replaced with anonymous identifiers or dummy data. Techniques for generating anonymous, private identifiers and using the identifiers to associate anonymous information to sensitive information in a non-identifiable manner are described in U.S. application Ser. No. 14/941,047, previously incorporated by reference.

Figure 5:
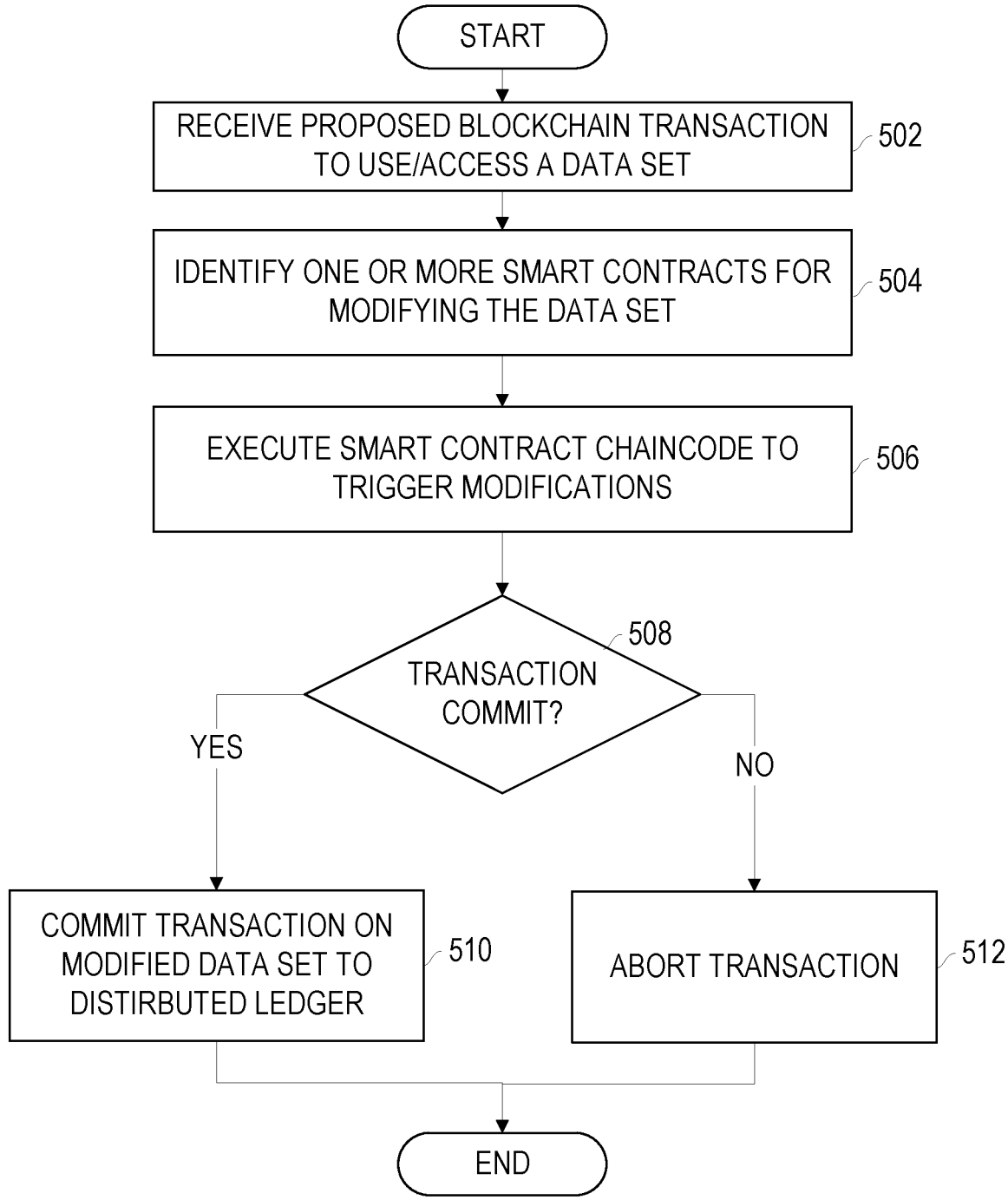
FIG. 5 illustrates an example set of operations for executing transactions on the blockchain network for modifying data sets based on criteria provided by blockchain members and/or privacy constraints.

FIG. 5 illustrates an example set of operations for executing transactions on the blockchain network for modifying data sets based on criteria provided by blockchain members and/or privacy constraints. One or more of the steps may be omitted, repeated, and/or performed in a different order. Accordingly, the specific arrangement of steps shown in FIG. 5 should not be construed as limiting the scope of the embodiments.

The process includes receiving a proposed blockchain transaction to use or otherwise access a data set (operation 502). The transaction may include identifiers and/or matching criteria as previously described that are matched to the data set.

Responsive to the request, a peer node identifies one or more smart contracts that control modifications of the data set (operation 504). In some embodiments, registration or other mapping information may be maintained, such as in a table, such that smart contracts are mapped to data sets. A smart contract may be registered and applicable to an individual data set or to groups of data sets, depending on the particular implementation. The peer node may search the mapping data to determine which smart contracts have been mapped to a matched data set.

The peer node further executes the associated chaincode with each of the one or more identified smart contracts to trigger modifications to the data set (operation 506). The modifications may include applying privacy filters, removing data, editing data, and/or linking data as previously described.

The peer node further determines whether to commit the transaction for the modified data set (operation 508). The peer node may determine whether to commit the transaction based on whether it is successfully endorsed and validated within the blockchain network as previously described.

If the transaction is successfully verified, then the transaction on the modified dataset is committed to a distributed ledger (operation 510). The ledger may include details about how the dataset was modified. For example, ledger may specify how many records were removed from a dataset and/or an indication that a privacy filter was applied.

If the transaction is not successfully verified, then the transaction on the modified dataset is aborted (operation 512).

8. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
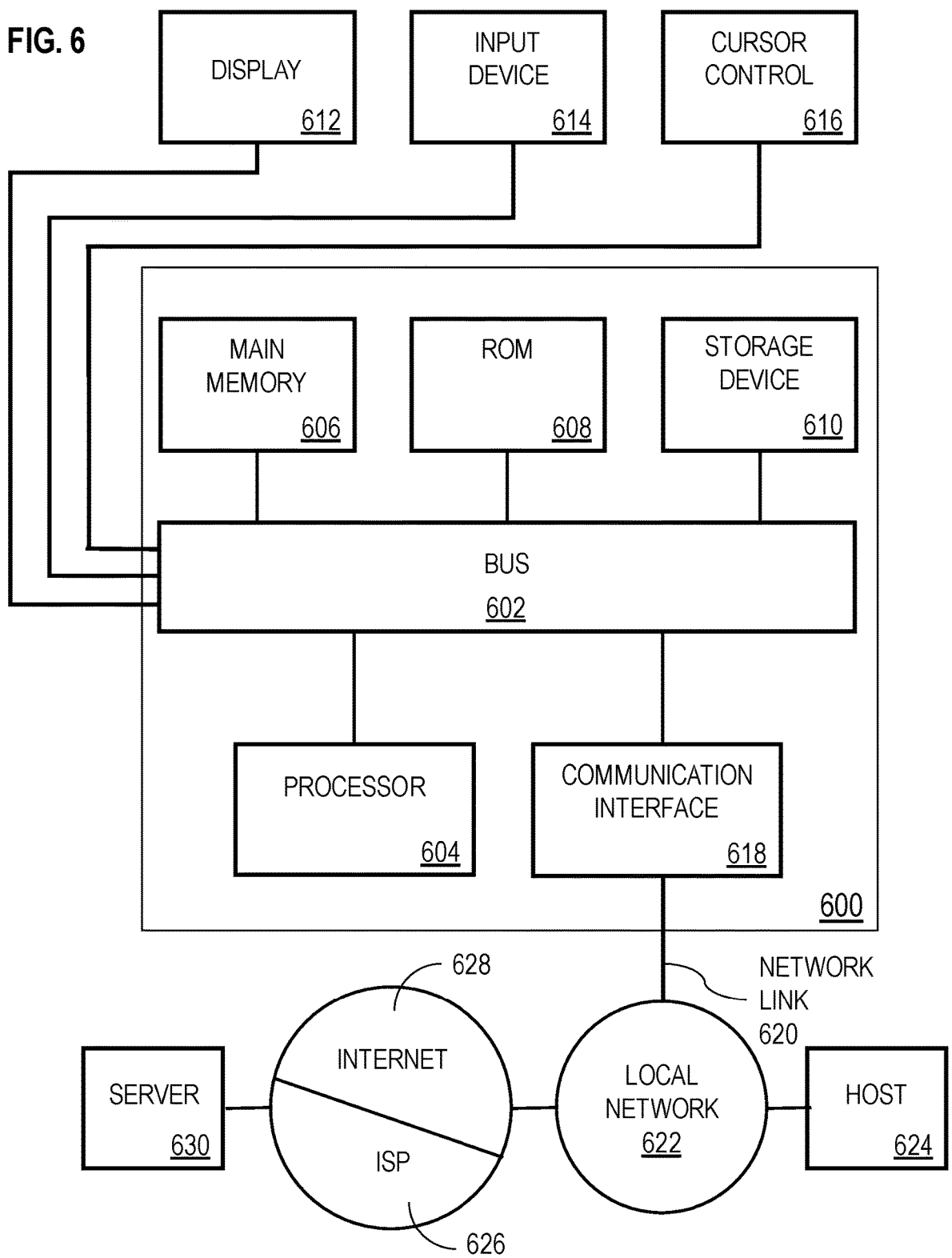
FIG. 6 shows a block diagram that illustrates a computer system in accordance with one or more embodiments.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving, from at least one node in a blockchain network, at least a first smart contract that governs access rights to data sets provided by a first set of one or more members of the blockchain network and at least a second smart contract that executes blockchain transactions based on usage of the data sets;

receiving, from a member of a second set of one or more members of the blockchain network, a request to perform a transaction to access, from the data sets, data that satisfies a set of criteria;

determining that a plurality of nodes in the blockchain network have approved the transaction based, at least in part, on the first smart contract;

responsive to detecting approval of the transaction by the plurality of nodes in the blockchain network, executing a first blockchain transaction that updates at least a first block in a set of one or more ledgers that is distributed to the first set of one or more members and the second set of one or more members of the blockchain network to indicate that the member of the second set of one or more members of the blockchain network has access to the data that satisfies the set of criteria;

detecting usage of the data set that satisfies the set of criteria; and responsive to detecting the usage of the data set that satisfies the set of criteria, executing, by the second smart contract, a second blockchain transaction that updates at least a second block in the set of one or more ledgers that is distributed to the first set of one or more members and the second set of one or more members of the blockchain network, wherein updating the second block comprising committing a record that includes a first set of one or more identifiers identifying which data sets matched the set of criteria and a second set of one or more identifiers identifying which members of the first set of one or more members of the blockchain network contributed data to the data sets matching the criteria.

2. The method of claim 1, wherein the second blockchain transaction is further executed based on performance metrics associated with usage of the data sets.

3. The method of claim 2, wherein the performance metrics are collected using scripting tags that are embedded within code for rendering at least a portion of a webpage.

4. The method of claim 1, wherein the first smart contract defines an option to acquire a data set and wherein the option is executed in the blockchain network when a set of option conditions are satisfied.

5. The method of claim 1, further comprising: receiving user identifiers from a plurality of blockchain members; mapping the user identifiers to central identifiers; identifying a subset of central identifiers that map to user identifiers provided by different blockchain members; and writing the subset of central identifiers to at least one ledger in the set of one or more ledgers in the blockchain network.

6. The method of claim 1, further comprising: writing data deletion requests to at least one ledger in the set of one or more ledgers in the blockchain network; wherein at least one peer node prevents transactions that include data subject to a data deletion request.

7. The method of claim 1, further comprising generating a cryptographic hash value for the second block as a function of at least the first set of one or more identifiers and the second set of one or more identifiers; and storing the cryptographic hash value in another block of the set of one or more ledgers.

8. The method of claim 1, wherein first set of one or more members are data providers and the second set of one or more members are data consumers; wherein the set of one or more ledgers is further distributed to at least a third member that provides a platform for using the data and at least a fourth member that provides data usage monitoring and performance analytic services.

9. The method of claim 1, wherein the first block and the second block are part of a single ledger that is distributed to the first set of one or more members and the second set of one or more members of the blockchain network.

10. The method of claim 1, wherein the first smart contract triggers an automatic modification to at least one data set based on at least one of a privacy constraint or a condition defined by at least one member of the blockchain network.

11. The method of claim 10, wherein the automatic modification includes removing one or more records or attributes from a set of records in a dataset.

12. One or more non-transitory computer-readable media storing instructions which, when executed by one or more hardware processors, cause:
receiving, from at least one node in a blockchain network, at least a first smart contract that governs access rights to data sets provided by a first set of one or more members of the blockchain network and at least a second smart contract that executes blockchain transactions based on usage of the data sets;
receiving, from a member of a second set of one or more members of the blockchain network, a request to perform a transaction to access, from the data sets, data that satisfies a set of criteria;
determining that a plurality of nodes in the blockchain network have approved the transaction based, at least in part, on the first smart contract;
responsive to detecting approval of the transaction by the plurality of nodes in the blockchain network, executing a first blockchain transaction that updates at least a first block in a set of one or more ledgers that is distributed to the first set of one or more members and the second set of one or more members of the blockchain network to indicate that the member of the second set of one or more members of the blockchain network has access to the data that satisfies the set of criteria;
detecting usage of the data set that satisfies the set of criteria; and
responsive to detecting the usage of the data set that satisfies the set of criteria, executing, by the second smart contract, a second blockchain transaction that updates at least a second block in the set of one or more ledgers that is distributed to the first set of one or more members and the second set of one or more members of the blockchain network, wherein updating the second block comprising committing a record that includes a first set of one or more identifiers identifying which data sets matched the set of criteria and a second set of one or more identifiers identifying which members of the first set of one or more members of the blockchain network contributed data to the data sets matching the criteria.

13. The one or more non-transitory computer-readable media of claim 12, wherein the second transaction is further executed based on performance metrics associated with usage of the data sets.

14. The one or more non-transitory computer-readable media of claim 12, wherein the first smart contract defines an option to acquire a data set and wherein the option is executed in the blockchain network when a set of option conditions are satisfied.

15. The one or more non-transitory computer-readable media of claim 12, wherein the instructions further cause: receiving user identifiers from a plurality of blockchain members; mapping the user identifiers to central identifiers; identifying a subset of central identifiers that map to user identifiers provided by different blockchain members; and writing the subset of central identifiers to at least one ledger in the set of one or more ledgers in the blockchain network.

16. The one or more non-transitory computer-readable media of claim 12, wherein the instructions further cause: writing data deletion requests to at least one ledger in the set of one or more ledgers in the blockchain network; wherein at least one peer node prevents transactions that include data subject to a data deletion request.

17. The one or more non-transitory computer-readable media of claim 12, wherein the instructions further cause: generating a cryptographic hash value for the second block as a function of at least the first set of one or more identifiers and the second set of one or more identifiers; and storing the cryptographic hash value in another block of the set of one or more ledgers.

18. The one or more non-transitory computer-readable media of claim 12, wherein first set of one or more members are data providers and the second set of one or more members are data consumers; wherein the set of one or more ledgers is further distributed to at least a third member that provides a platform for using the data and at least a fourth member that provides data usage monitoring and performance analytic services.

19. The one or more non-transitory computer-readable media of claim 12, wherein the first block and the second block are part of a single ledger that is distributed to the first set of one or more members and the second set of one or more members of the blockchain network.

20. The one or more non-transitory computer-readable media of claim 12, wherein the first smart contract triggers an automatic modification to at least one data set based on at least one of a privacy constraint or a condition defined by at least one member of the blockchain network.

\* \* \* \* \*

UNITED STATES PATENT AND TRADEMARK OFFICE
CERTIFICATE OF CORRECTION

PATENT NO. : 11,397,728 B2
APPLICATION NO. : 16/835169
DATED : July 26, 2022
INVENTOR(S) : Pandey et al.

It is certified that error appears in the above-identified patent and that said Letters Patent is hereby corrected as shown below:

On the Title Page

Column 1, under Assignee, Line 1, delete "lnternational" and insert -- International --, therefor.

In the Drawings

On sheet 4 of 6, in FIG. 4, under Reference Numeral 408, Line 3, delete "SATISIFIED?" and insert -- SATISFIED? --, therefor.

On sheet 5 of 6, in FIG. 5, under Reference Numeral 510, Line 3, delete "DISTIRBUTED" and insert -- DISTRIBUTED --, therefor.

In the Specification

In Column 5, Line 51, delete "and or" and insert -- and/or --, therefor.

In Column 6, Line 21, delete "sets. criteria" and insert -- sets criteria --, therefor.

In Column 8, Line 39, delete "to" and insert -- to be --, therefor.

In Column 13, Line 30, delete "etc." and insert -- etc.). --, therefor.

In Column 15, Line 9, delete "service" and insert -- service. --, therefor.

In Column 17, Line 37, delete "thread)" and insert -- thread). --, therefor.

Signed and Sealed this
Third Day of January, 2023

Katherine Kelly Vidal
*Director of the United States Patent and Trademark Office*